R. Pratt.

Horse Hay Rake.

No. 1894 Reissued Feb. 28, 1865

Witnesses.

E. Schupfer

R. J. Campbell

Inventor

Ransom Pratt

Per Munn, Fenwick & Parmenter

Attys

N. PETERS, PHOTO-LITHOGRAPHER, WASHINGTON, D. C.

UNITED STATES PATENT OFFICE.

RANDAL PRATT, OF MARPLE TOWNSHIP, DELAWARE COUNTY, PA.

IMPROVEMENT IN HORSE HAY-RAKES.

Specification forming part of Letters Patent No. 14,067, dated January 8, 1856; Reissue No. 1,894, dated February 28, 1865.

DIVISION No. 2.

*To all whom it may concern:*

Be it known that I, RANDAL PRATT, of the township of Marple, Delaware county, State of Pennsylvania, have invented a new and Improved Horse Hay-Rake; and I do hereby declare that the following is a full, clear, and exact description of that part of my invention which relates to Division No. 2, reference being had to the accompanying drawings, making a part of this specification, in which—

Figure 2:
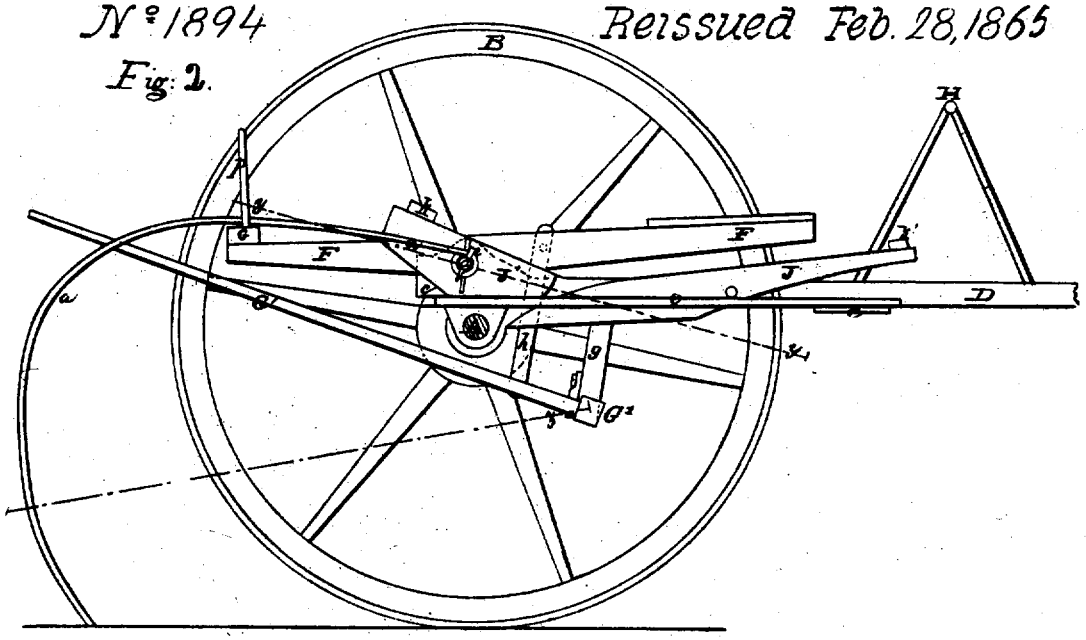
Figure 1:
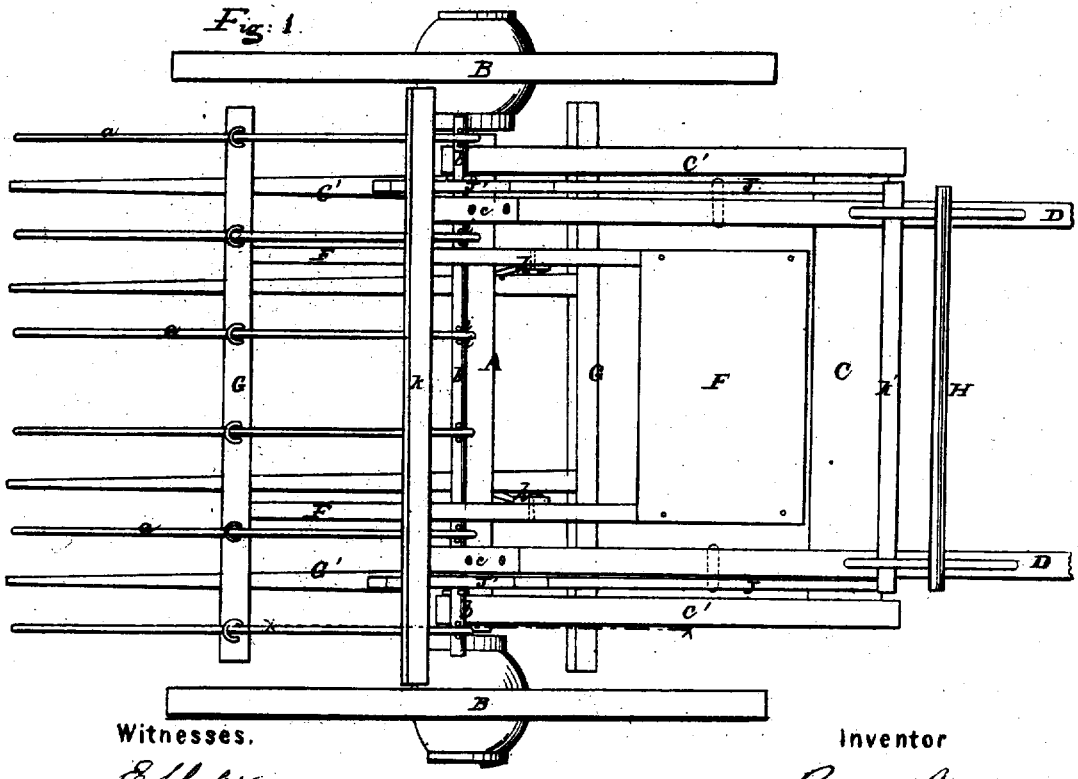

Figure 1 is a plan view of a rake with my improvement applied to it. Fig. 2 is a vertical longitudinal section of the same in the line *x x* of Fig. 1.

The nature of my invention under this patent consists, first, in constructing a wheeled rake with a clearer to its teeth in such a manner that both the teeth and the clearer can be vibrated in converse directions by the attendant or driver while he is riding upon the rake-carriage, the rake-teeth being suspended on the carriage so as to only vibrate, and the clearer so arranged between its teeth as to resist the ascent of the hay with them during their upward movement to effect the discharge of their gathered load, the resistance offered to the hay by the clearer increasing as the height of elevation of the rake increases, and thus a compacting or pressing of the hay while it is being discharged upon the ground is effected.

It consists, second, in the arrangement of a rake which vibrates to free its teeth of their gathered load of hay and a vibrating clearer connected to the carriage of the rake and to the contrivance which operates the teeth in such manner and in such relation to the attendant or driver that converse vibrating movements can be imparted to the rake-teeth and clearer at the same time by the one actuating contrivance while the machine or carriage is moving and the driver mounted upon the same, as will be hereinafter described.

My rake with clearer to its teeth is an improvement on that class of rakes with clearers to their teeth which are known as "revolving" rakes, such rakes being suspended on runners or shoes, and freeing their teeth from the collected hay by making a complete revolution, in making which their teeth pass a vibratory clearer, which holds and presses the hay upon the ground. It is also an improvement on that class of vibrating rakes with clearers to their teeth which are moved upon runners or shoes, and which are operated by an attendant who walks upon the ground in rear of the teeth.

To enable others skilled in the art to make and use my invention, I will proceed to describe its construction and operation.

The carriage which supports the rake and the devices for operating it consists of an axle-tree, A, mounted upon two rotating wheels, B B, and provided with a platform or stand-board, C C′, for the driver. This platform C is some distance in advance of the axle, and is sustained by means of the thills D D, which are hung upon the axle, as shown.

The rake-teeth *a* are all independently pivoted by any form of movable joint to a horizontal bar, *b*, which extends across the machine nearly over and in line with the axle-tree A, upon which this bar is supported at suitable points by means of bearings *c c*, as shown in Figs. 1 and 2 of the drawings.

At an intermediate point between the ends of the rake-bar *b*, and within the open frame of the platform C C′, another frame, F, is pivoted upon the axial bar *b*. This frame extends both forward and in rear of said bar some distance, and on its rear end a horizontal transverse bar, G, is secured, over which all of the teeth pass, (through loop or staple guides *p* therein,) so as to rest upon it, as shown. On the forward end of the frame a foot-board is secured, upon which the driver, while mounted upon the stand-board C, can press his foot and elevate the teeth of the rake at such times as it may be necessary to free the teeth of their collected load of hay. When the forward end of the frame F is depressed its rear end, with the lifting-bar G, rises and carries all the teeth upward. Any other equivalent device for elevating the teeth may be substituted for the one described. The position which the frame F assumes when operated to elevate the teeth is indicated by the red line *y y* in Fig. 1.

*k* is a pressure-bar arranged on the rear extremities of rocking levers J′ J′, which are hung on the axial bar *b*. The levers J′ J′ are extended forward of the axle-shaft *b* a short distance upon foot-levers or treadle-levers J J, which are pivoted to the sides of the thills D D, as shown, and connected at their forward extremities by a foot-board, $k'$, located above and just forward of the platform C. By means of the bar $k$ through the devices J′ J $k'$, operated by the foot of the driver, any desired pressure for keeping the rake-teeth down to their work may be applied to the teeth. Any other equivalent device may be substituted for the one described to keep the teeth down to their work.

Beneath the axle A, and supported in pendent bearings $g$ $g$, is a fork, G′, which consists of a number of teeth secured to transverse bars, which latter constitute the oscillating head of the fork. The teeth of this fork extend back under the axle A to and between the rake-teeth $a$, as shown. The fork G′ is hung by its head to the bearings $g$ $g$, so as to vibrate, and is connected with the frame F or other equivalent device which actuates the rake by means of links $h$, as represented, or in any other equivalent way. With this arrangement of clearer to vibrating rake-teeth, it will be evident that when the rake-teeth are thrown down to their raking position, as illustrated in Fig. 1, the clearer is thrown up out of the way of the hay which is being gathered by the teeth $a$; but when the treadle-frame F is moved in the plane indicated by the red line $y$ $y$ in Fig. 1, and the rake-teeth thereby elevated, the clearer is thrown down to the position indicated by the red line $z$ $z$, and thereby caused to clear the rake-teeth of their gathered load and to press the hay compactly as it discharges upon the ground. The fork G′ is again thrown up out of the way of the hay to be collected by the teeth simultaneously with the withdrawal of the pressure from the foot-board and the descent of the teeth to their raking position.

In practice it will not be necessary to have as many fork-teeth for clearing purposes as there are tines or teeth to the rake, as the condition of the hay, when gathered upon the rake, is such that a fork with a few teeth will effectually clear it from the teeth. The clearing fork, by pressing down upon the hay as it discharges upon the ground, lessens the inconvenience so often experienced from the hay being blown about by the wind after it has been raked and deposited in windrows over the field. The hay being thus compacted can be rolled together or pitched into a cart with great facility.

Having shown and described one practical arrangement for carrying out my invention, I will state that I do not confine myself to the particular construction of the devices shown, as the same may be modified in different ways without departing from the principle of operation involved; but

What I claim, and desire to secure by Letters Patent, is—

1. Constructing a wheeled horse-rake with a vibrating clearer to its teeth, so that the attendant or driver, while riding on the rake-carriage, can operate the cleaner and the rake-teeth, substantially in the manner and for the purpose described.

2. The arrangement and connection of a vibrating clearer with a vibrating rake, so that converse vibrating movements can be imparted to the rake-teeth and to the clearer at the same time and by the one actuating contrivance while the machine is in operation and the attendant who vibrates the rake and clearer is mounted upon the machine, substantially as herein described.

RANDAL PRATT.

Witnesses:
GEO. H. RIGBY,
EZRA SMEDLEY.